(12) United States Patent
Hargroder

(10) Patent No.: US 7,252,300 B2
(45) Date of Patent: Aug. 7, 2007

(54) MANUAL BRAKE FOR A WHEELCHAIR WITH A VARIABLE BRAKING FORCE

(76) Inventor: Todd L. Hargroder, 7626 Grissom Rd., San Antonio, TX (US) 78251

( * ) Notice: Subject to any disclaimer, the term of this patent is extended or adjusted under 35 U.S.C. 154(b) by 0 days.

(21) Appl. No.: 10/694,508

(22) Filed: Oct. 27, 2003

(65) Prior Publication Data

US 2005/0012303 A1     Jan. 20, 2005

Related U.S. Application Data

(60) Continuation-in-part of application No. 10/622,339, filed on Jul. 18, 2003, which is a division of application No. 10/154,356, filed on May 23, 2002, now Pat. No. 6,634,665, which is a continuation of application No. 09/921,498, filed on Aug. 3, 2001, now Pat. No. 6,471,231.

(51) Int. Cl.
*A61G 5/10* (2006.01)
*B62L 1/06* (2006.01)
*F16C 1/12* (2006.01)

(52) U.S. Cl. ................ 280/304.1; 188/24.16; 74/502.2

(58) Field of Classification Search ........... 188/2 F, 188/24.16; 280/304.1, 250.1, 282; 74/502.2, 74/516, 518, 532, 537
See application file for complete search history.

(56) References Cited

U.S. PATENT DOCUMENTS

| 1,674,751 | A | * | 6/1928 | Von Luettwitz | 188/18 R |
|---|---|---|---|---|---|
| 3,379,074 | A | * | 4/1968 | Hirst, Jr. | 74/470 |
| 3,942,609 | A | * | 3/1976 | Hill | 188/24.16 |
| 4,204,588 | A | * | 5/1980 | Kawecki | 188/2 F |
| 4,271,718 | A | * | 6/1981 | Bopp et al. | 74/522 |
| 4,292,858 | A | * | 10/1981 | Lipshield | 74/501.6 |
| 4,548,421 | A | * | 10/1985 | Wiener | 280/282 |
| 4,588,200 | A | * | 5/1986 | Kanamori | 280/269 |
| 4,826,190 | A | * | 5/1989 | Hartmann | 280/236 |
| 5,145,197 | A | * | 9/1992 | Gatti | 280/304.1 |

(Continued)

FOREIGN PATENT DOCUMENTS

EP     1228955 A2 *  8/2002

(Continued)

*Primary Examiner*—Lesley D. Morris
*Assistant Examiner*—Daniel Yeagley
(74) *Attorney, Agent, or Firm*—Gunn & Lee, P.C.; John C. Cave

(57) ABSTRACT

Manual braking system with a variable braking force for a wheelchair. Caliper type brakes positioned to mount on and exert braking force on disks mounted to interior "disk" hubs rotatably mounted to the wheelchair frame wheel hubs are mated with the "disk" hubs with a push button release pin allowing the wheel to be quickly removed without disturbing disk braking system. Caliper brakes are actuated by a manual lever arm, cable and pulley combination mounted to the frame of the wheelchair. The lever is provided with and without a plunger mechanism. A plunger mechanism allows the user to maintain the manual braking force exerted on lever without hands. The plunger mechanism is fixably mounted and positioned to insert a plunger head into notches on the lever. The force exerted by the plunger head is sufficient to hold the plunger head within the notch and prevent movement of the lever without manual force.

18 Claims, 13 Drawing Sheets

U.S. PATENT DOCUMENTS

| | | | | |
|---|---|---|---|---|
| 5,280,938 A | * | 1/1994 | Berry | 280/304.1 |
| 5,303,609 A | * | 4/1994 | Iwanaga et al. | 74/523 |
| 5,346,039 A | * | 9/1994 | Pfisterer | 188/2 F |
| 5,433,464 A | * | 7/1995 | Hlebakos | 280/47.27 |
| 5,492,355 A | * | 2/1996 | Berry | 280/304.1 |
| 5,540,304 A | * | 7/1996 | Hawkins et al. | 188/24.15 |
| 5,667,236 A | * | 9/1997 | Murphy | 280/304.1 |
| 5,799,756 A | * | 9/1998 | Roberts et al. | 188/2 F |
| 5,845,539 A | * | 12/1998 | Huang | 74/489 |
| 6,186,282 B1 | * | 2/2001 | Juan | 188/24.16 |
| 6,311,805 B1 | * | 11/2001 | Juan | 188/24.16 |
| 6,523,649 B1 | * | 2/2003 | Juan | 188/24.16 |
| 6,662,675 B2 | * | 12/2003 | Lee et al. | 74/500.5 |
| 2003/0151300 A1 | * | 8/2003 | Goss et al. | 301/110.5 |

FOREIGN PATENT DOCUMENTS

JP     2001130389 A   *   5/2001

* cited by examiner

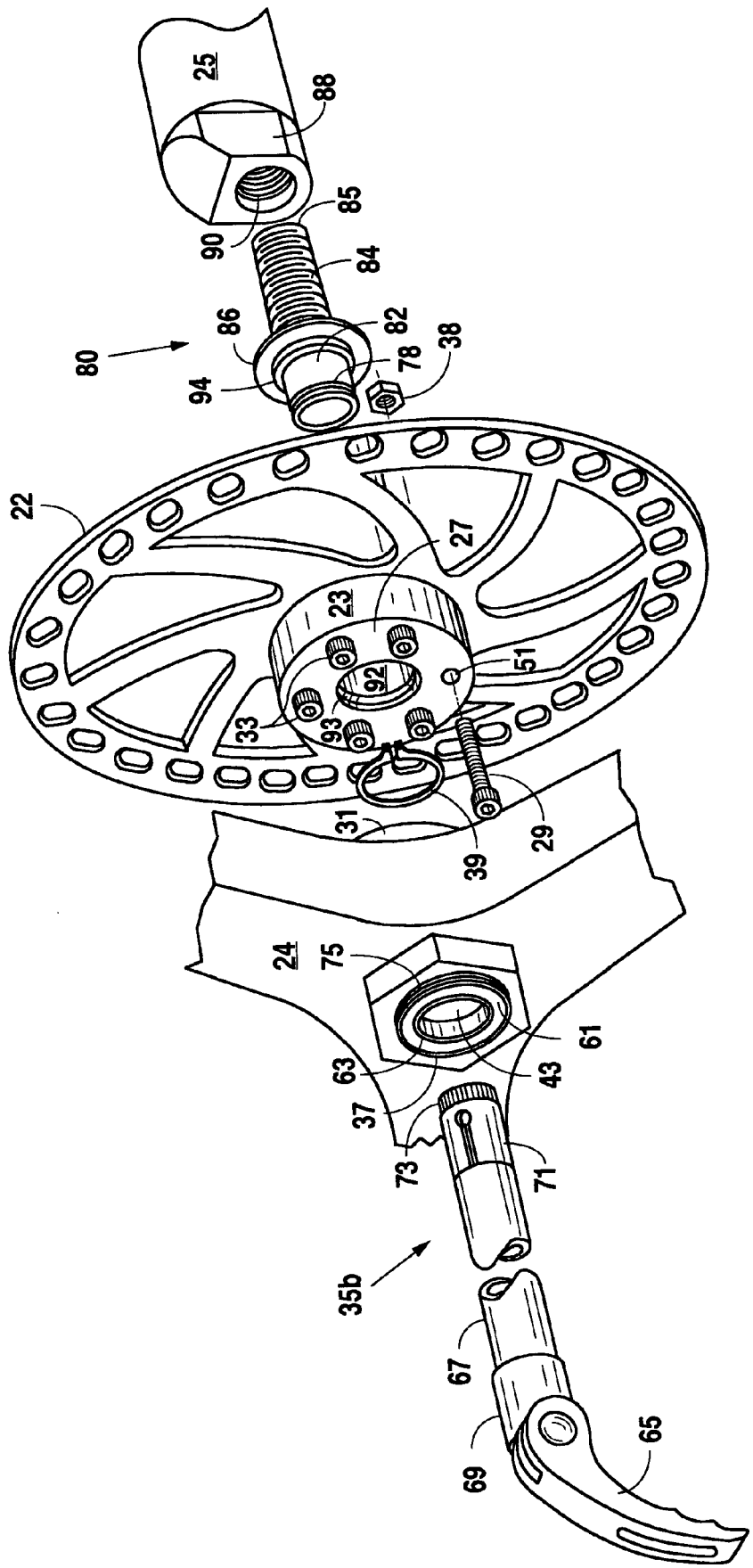

MANUAL BRAKE FOR A WHEELCHAIR WITH A VARIABLE BRAKING FORCE

This application is a continuation in part of my now pending U.S. patent application Ser. No. 10/622,339 filed on Jul. 18, 2003 which is a divisional application based on patent application Ser. No. 10/154,356 filed on May 23, 2002 (now U.S. Pat. No. 6,634,665 B1) which is a continuation Ser. No. 09/921,498, now of U.S. Pat. No. 6,471,231 B1 issued Oct. 29, 2002 and filed Aug. 3, 2001.

BACKGROUND OF THE INVENTION

1. Field of the Invention

The present invention relates generally to the field of wheelchairs and, more specifically, to a manual braking system with a variable braking force and quick release, detachable wheels for manual wheelchairs.

2. Description of the Related Prior Arts

Numerous types of braking mechanisms for manual wheelchairs are known in the art. The most typical manual wheelchair brake is a manual "over center" locking device which is activated by a lever arm and, when forced into its locking position, presses a braking member against the surface of the wheelchair tire creating a frictional braking action. Several factors mitigate against the usefulness and reliability of these types of brakes. Loss of tire pressure reduces the frictional force exerted by the crossbar on the tire and hence reduces the braking effect. A significant air pressure loss leaves these brakes useless. During transfer in and out of the chair, this type of brake allows the tire to slide underneath the crossbar and the wheelchair to move. Similarly, the brakes are ineffective and will not adequately hold the wheelchair on an incline. Other types of manual brakes include caliper type brakes manually activated with a lever arm mounted to a cable and brake assembly causing brake pads to press against the rim of the wheelchair wheel. Typically, braking mechanisms for wheelchairs only apply a braking force to one wheel. If an equal braking force is desired on both wheels, the user is required to perform the difficult task of using both arms at the same time. Finally, these types of manual brakes, whether caliper type brake or not, do not allow for a variable braking force to be exerted on the tire or rim. A variable braking force allows the user to both slow the wheelchair and ultimately stop it and hold it in place when desired.

Patents to Ross and Gunther, U.S. Pat. No. 5,358,266 and Lautzenhiber, U.S. Pat. No. 4,805,711 describe a braking member, which applies a braking frictional force directly to the wheelchair tire which is manually activated by a lever arm. There are also disclosed in the art several manual braking mechanisms which utilize a cable actuated caliper braking mechanism on the rim of one wheel or on the rims of both wheels with two distinct braking systems operating separately. Examples of these types of braking mechanisms are disclosed in patents to Herron, U.S. Pat. No. 4,560,181; Kawecki, U.S. Pat. No. 4,204,588; and Lemarie, U.S. Pat. No. 4,538,826. Finally, a patent to Berry, U.S. Pat. No. 5,492,355 discloses a caliper type braking mechanisms that discloses caliper type brakes which operate on the tire rim of each wheelchair wheel and can be activated by the use on one lever. Many of the same deficiencies discussed above apply to each of these braking mechanisms.

Wheelchair users have reason to frequently remove the wheels from their wheelchairs. It is often done for storage purposes, for brake adjustment, for wheel repair, and for wheel exchange. For example, in order to store a wheelchair in a vehicle, it is often desirable to remove the wheels.

Heretofore, the wheels on manual wheelchairs and other types of wheelchairs have been attached to the wheelchair frame by some type of hub with the wheels secured to the hub with nuts and bolts. In order to remove the wheels from the wheelchair, it has been necessary to unscrew and remove each of the nuts and bolts securing the wheel to the hub. This is a time consuming and cumbersome process. Once again, wheelchair users who have arm or hand limitations may not be physically able to remove the nuts and bolts.

More recently, it has become common in the art to attach wheels to manual wheelchairs using quick release locking pins which hold the wheel to the axle. In this type of design, it is difficult to also have a braking means on the wheelchair wheel other than the manual "over center" locking device which presses a braking member against the surface of the tire as described herein. Heretofore, other braking systems such as those which utilize caliper type brakes operating on the rim of the wheelchair wheel, have been ineffective on wheelchairs with quick release locking pins because the braking means had to be released and moved or disassembled in order to remove the wheel and thereby defeating the purpose of the quick release locking pin.

It is desirable to have a wheelchair with an effective easily operatable manual braking mechanism and, at the same time having quick release detachable wheels.

SUMMARY OF THE INVENTION

It is an object of this invention to provide a manually activated braking system for a wheelchair which provides a braking force to a disk, as opposed to the tire surface or rim of the wheelchair wheel and thereby provide more efficient braking action.

It is a further object of this invention to provide a manual braking system for a wheelchair which allows for a variable braking force to slow the wheelchair during operation.

It is a further object of this invention to provide a braking system for manual wheelchairs, which provides equal braking force to both wheels of a wheelchair simultaneously.

It is a further object of this invention to provide a manual braking means for manual wheelchairs, which allows for detaching the wheelchair wheels without disturbing the braking means.

It is a further object of this invention to provide for quick release, easily detachable wheels.

It is a further object of this invention to provide for detachable wheels, which eliminates the need for users of the wheelchair to unscrew numerous nut and bolt combinations in order to remove the wheel.

It is a further object of this invention to provide for quick release, easily detachable wheels which allow the wheels to be removed without removing the disk and brake assembly.

In order to achieve these objectives, this invention provides for a manual braking system for a wheelchair which is comprised of a braking means, a cable pully system attached to the braking means, and a manual lever assembly pivotally mounted to the wheelchair frame for activating the braking means.

It is anticipated that the preferred braking means is a caliper-type brake positioned to clamp onto a metal disk mounted axially to a hub which rotates on the axle of each wheelchair wheel. The hub on which the disk is mounted interlocks with the hub on which the wheelchair wheel is mounted. The interlocking hubs are locked together with a locking pin, which extends axially through the center of the mated hubs such that the hubs are locked and rotate together when the wheelchair wheel is turned.

The locking pin is equipped with retractable nipples which, when extended, hold the locking pin securely in place. The retractable nipples are spring biased in the extended position and are activated by a push button at one end of the locking pin which releases the spring and allows the nipples to retract. When the nipples are in the retracted position, the locking pin can be removed simply by sliding it out of the axle. This allows the wheelchair wheel to be removed since there is no longer anything holding the mated hubs together.

The manual lever assembly comprises a mounting bracket having a mounting shoulder, a lever arm pivotally attached to the mounting bracket, and a linking member pivotally attached to both the lever arm and the pulley. The linking member is attached in such a manner that when the lever arm is rotated, the linking member is displaced horizontally and thereby causing horizontal displacement of the pulley.

The braking means for each wheel are connected to opposite ends of a cable wire. The ends of the cable wire are directed through small openings in perpendicular element of the mounting bracket and around the pulley such that displacement of the pulley provides equal force and displacement to said opposite ends of the cable wire. The small openings are spaced a distance equal to the diameter of the pulley so the cable wire remains parallel as it extends from the pulley through said openings. The pulley is axially and pivotally connected to the linking member and positioned between the mounting bracket and the linking member. A pin connecting the pulley and the linking member also extends through and slides in a horizontal slot in the mounting bracket and thereby causing the displacement of the pulley to be in a horizontal plane.

The lever arm can be rotated in two different directions. When the actuating lever is rotated in a first direction, it will cause the linking member to displace horizontally pulling the pulley and cable wires and activating the braking force. The further the lever arm is rotated, the greater the braking force exerted on the disk and the operator can vary the braking for in this manner. When the lever arm is rotated in the opposite direction, it will cause the linking member to displace in the opposite horizontal direction pushing the pulley and cable wire and deactivating the braking force.

I an alternate embodiment of this invention, a plunger assembly with a spring biased rounded head is mounted through an opening in the mounting bracket. The plunger assembly is positioned to allow the rounded head to extend into a series of semi-hemispherical notches on the inner surface of the actuating lever. The notches are radially spaced around the pin connecting the lever arm to the mounting bracket. The notches are positioned such that each notch will separately receive the plunger pin as the lever arm is rotated. The force exerted by the spring and the plunger pin is sufficient to prevent the lever arm from rotating until it receives sufficient manual force. In this manner, each notch represents a different level of braking force to be applied to the disk.

BRIEF DESCRIPTION OF THE DRAWINGS

FIG. 2B is an enlarged exploded perspective view depicting the locking pin, wheelchair wheel, hub, disk, and axle assembly wherein the locking pin is equipped with a lever which activates an expandable tip.

FIG. 2E is an enlarged exploded perspective view depicting FIG. 2D from the opposite angle.

DETAILED DESCRIPTION OF THE PREFERRED EMBODIMENT

Figure 1:
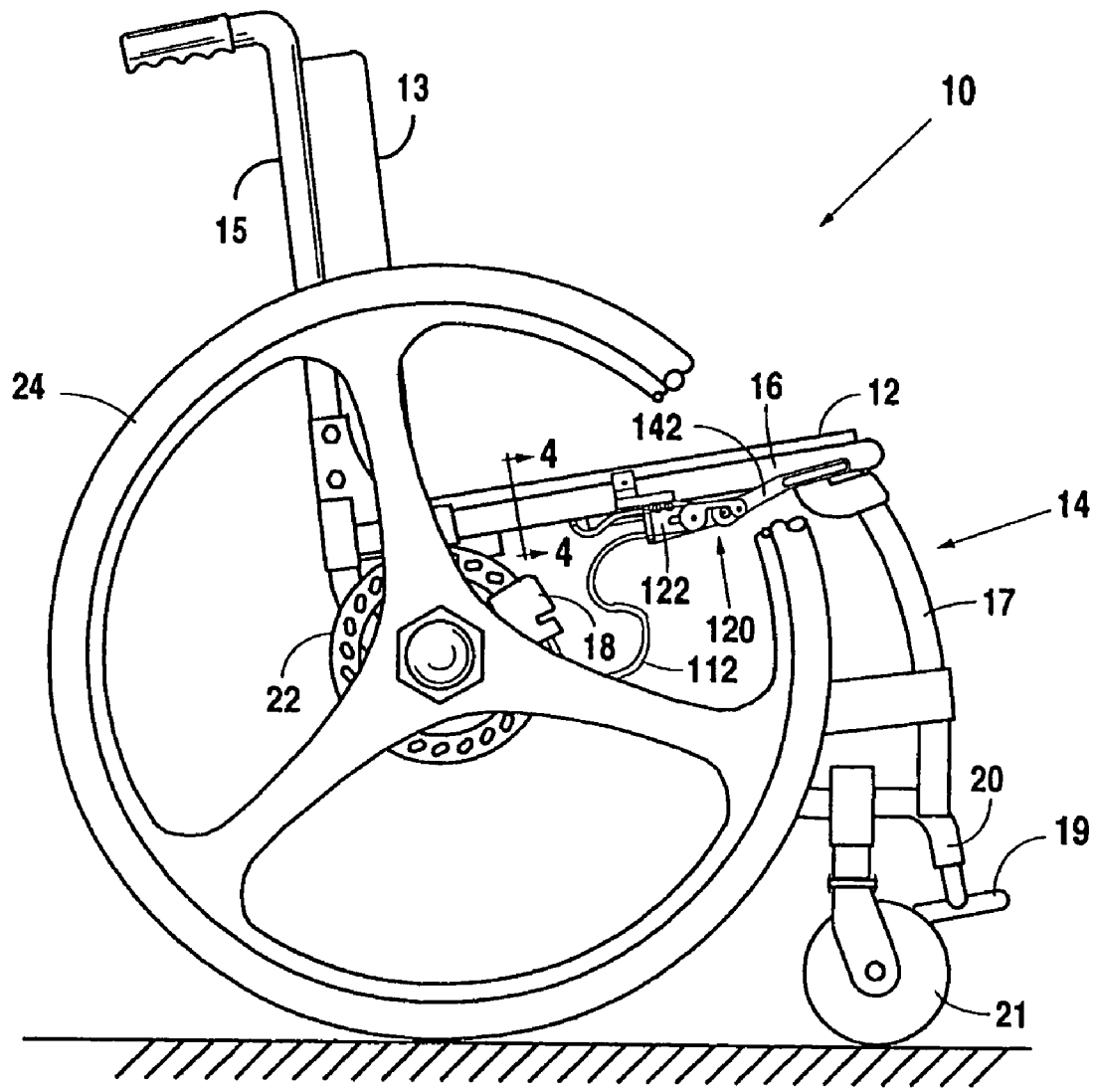
FIG. 1 is a elevational side view of a manual wheelchair depicting manual brake actuator assembly and a caliper braking mechanism mounted to the wheelchair frame and positioned to clamp onto a metal disk mounted axially to the hub of the wheelchair wheel.

Referring to FIG. 1, a lightweight manual wheelchair 10 is equipped with a seat 12, and seat back 13 mounted between first and second wheelchair wheels 24 generally to a frame 14. The frame 14 has a vertical component 15, a side horizontal component 16, a frontal curved component 17 and a lower curved component 20. A footrest 19 is mounted at the frontal extremity of the lower curved component 20 of the frame 14. First and second caster wheels 21 are pivotally mounted toward the frontal extremity of the lower curved component 20 of the frame 14. The manual wheelchair 10 is symmetrical about a centre line and the opposed side is identical to the side visible in FIG. 1. Thus, when the first and second of numbered items are referred to without the second item being shown, it can be appreciated that the second numbered item is identical to the first but on the opposite side of the wheelchair.

Figure 2A:
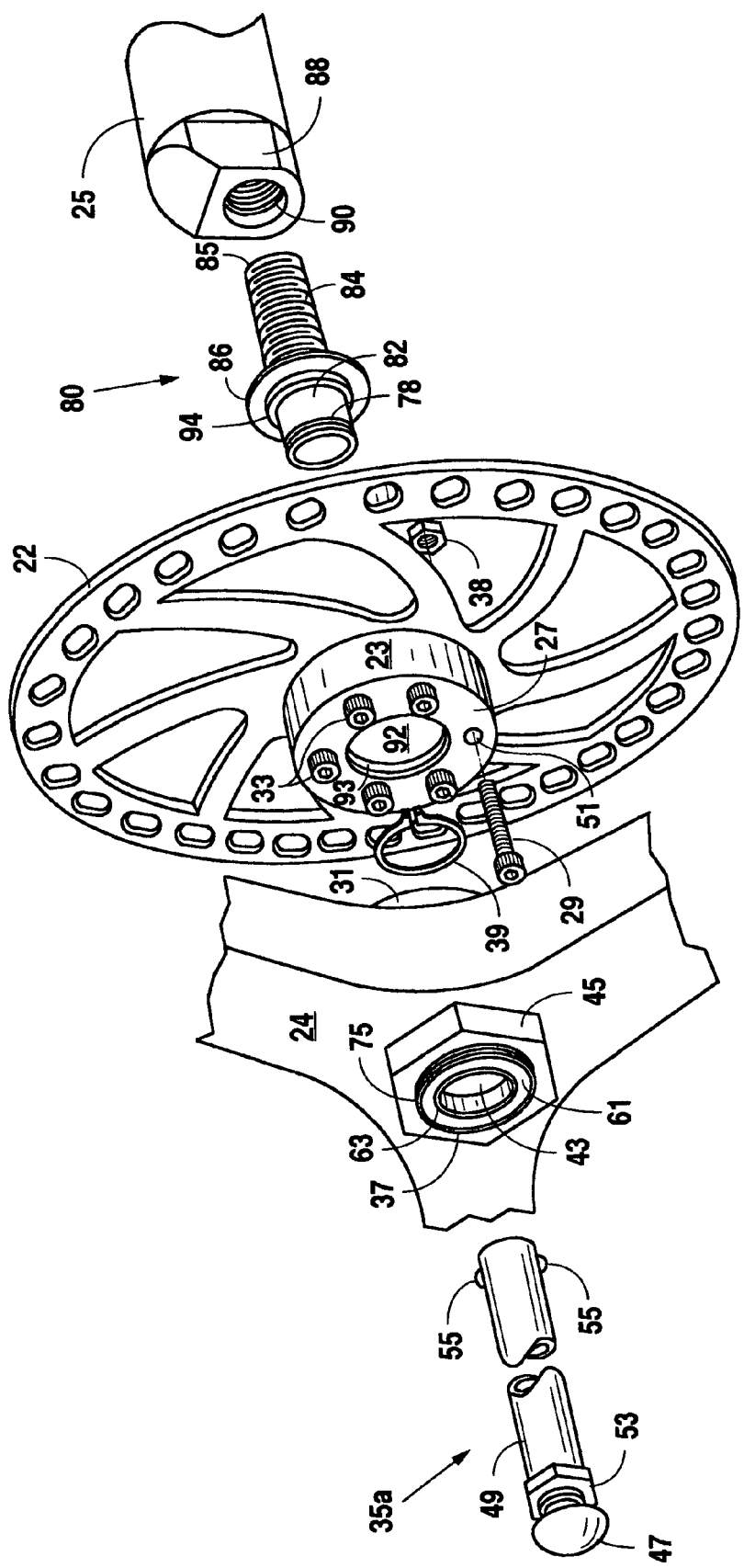
FIG. 2A is an enlarged exploded perspective view depicting the locking pin, wheelchair wheel, hub, disk, and axle assembly which has a spring biased push button type locking pin and first interlocking hub design.
Figure 2C:
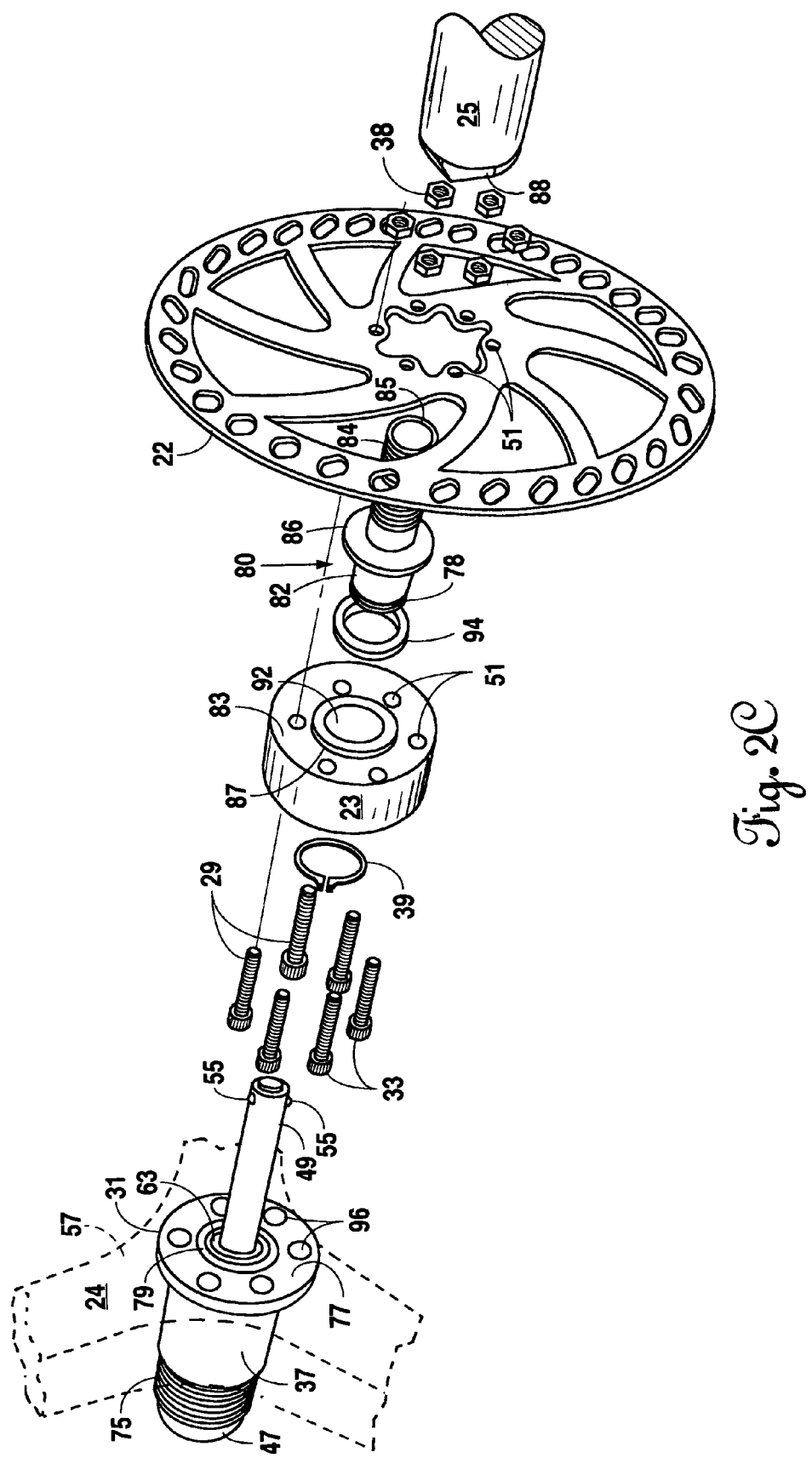
FIG. 2C is an enlarged exploded perspective view depicting FIG. 2A from the opposite angle.
Figure 2D:
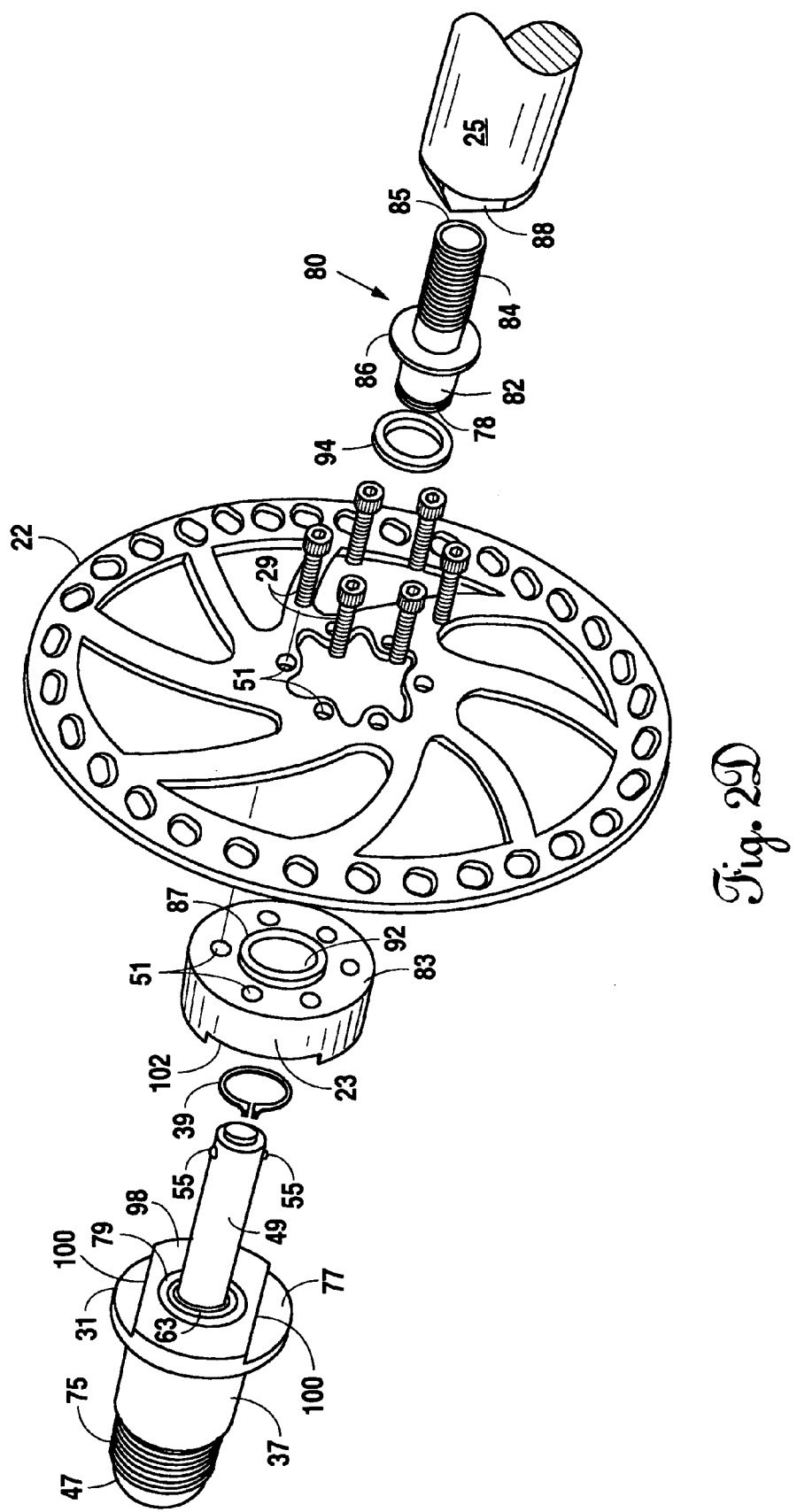
FIG. 2D is an enlarged exploded perspective view depicting the locking pin, wheelchair wheel, hub, disk, and axle assembly. This figure depicts a second interlocking hub design.
Figure 26:
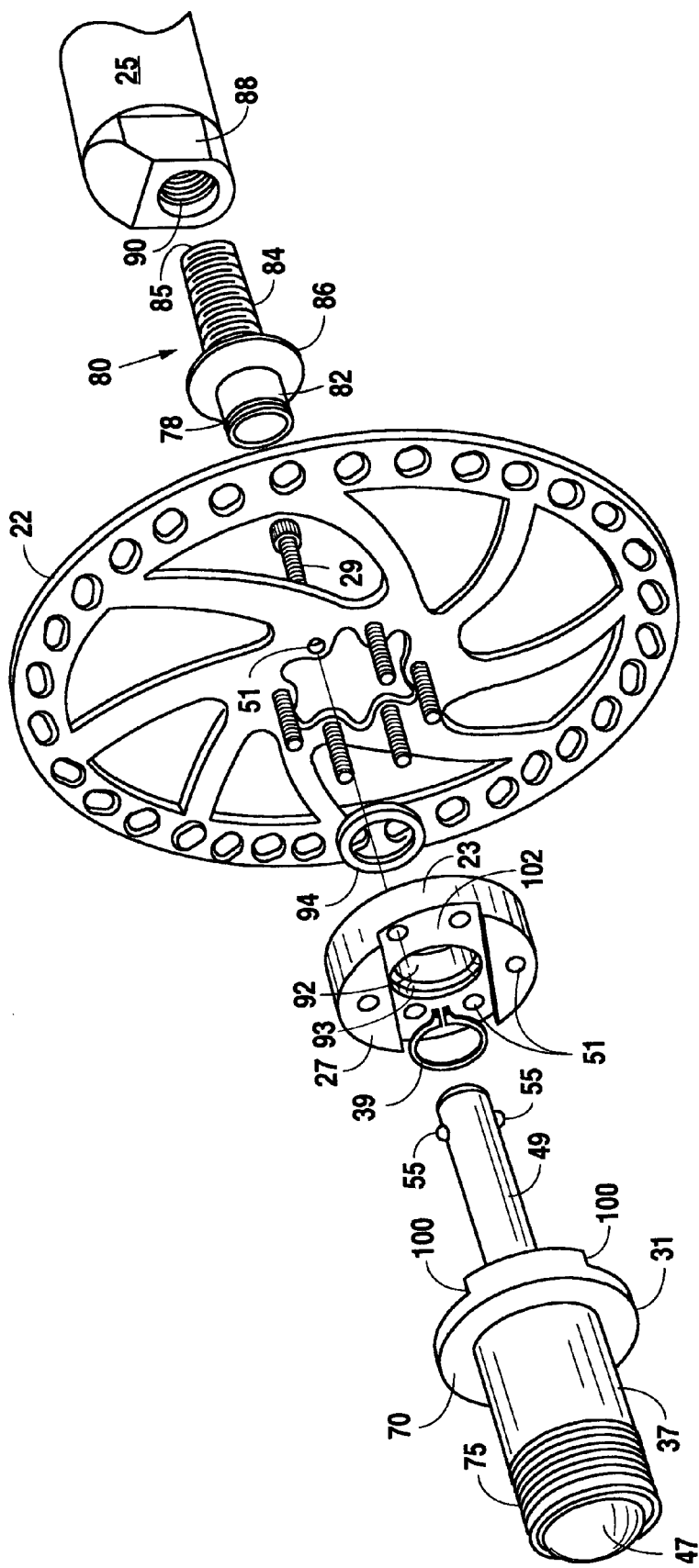

Referring to FIGS. 2A through 2E, the first and second disks 22 are concentrically mounted to the inner face 83 first and second disk hubs 23 by means of a plurality of screws 29 passing through radially spaced interiorly threaded, aligned holes 51 in the first and second disk hubs 23 and the first and second disks 22. In the preferred embodiment, as shown in FIGS. 2A, 2B, and 2C, the screws 29 are Allen screws where the heads 33 of the screws 29 extend from the outer vertical faces 27 of the first and second disk hubs 23 and are secured on the opposite end by nuts 38. In a second preferred embodiment, as shown in FIGS. 2D and 2E, the screws 29 are of a length insufficient to extend beyond the outer vertical faces 27 of the first and second disk hubs 23.

The first and second disk hub 23 and disk 22 assemblies are concentrically mounted to outer ends of first and second detachable axle pieces 80 and rotate thereon. The first and second detachable axle pieces 80 are tubular with a smooth surface portion 82 at their outer end and a exteriorly threaded portion 84 at their inner end. The smooth surface portion 82 and the exteriorly threaded portion 84 are divided by a flange 86.

Figure 3:
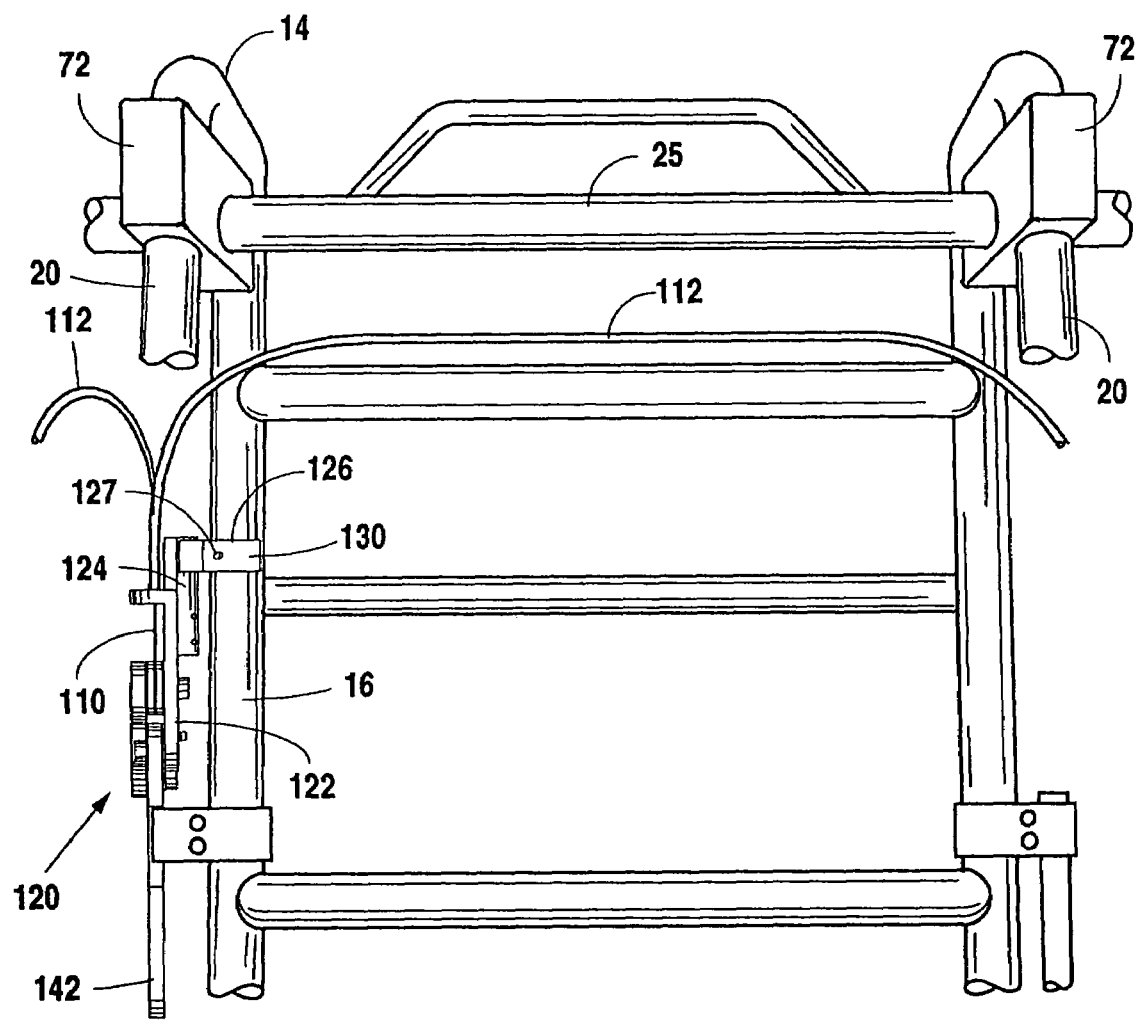
FIG. 3 is a bottom view of the wheelchair seat depicting the manual brake actuator assembly mounted to the wheelchair frame.
Figure 4:
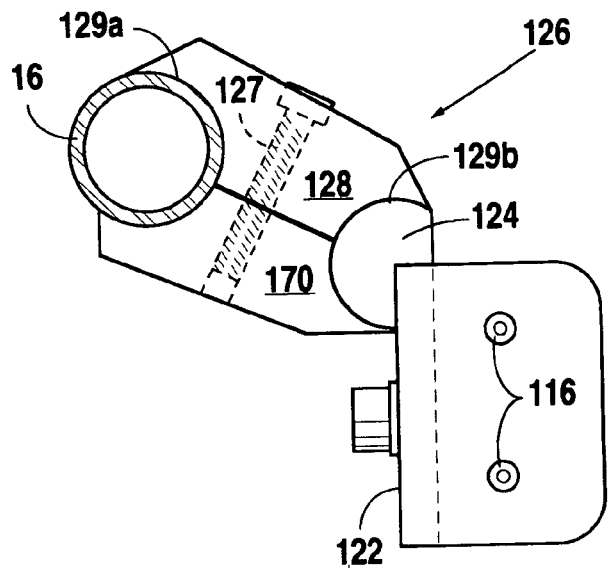
FIG. 4 is a rear elevational view depicting the clamp and mounting bracket of the manual brake actuator assembly.

The first and second detachable axle pieces 80 are mounted to the frame 14 of the wheelchair 10 (see FIG. 1) by screwing the exteriorly threaded portion 84 into a tubular axle 25. As shown in FIG. 3, the tubular axle 25 is clamped to the first and second lower curved components 20 of the frame 14 (See FIG. 1) at its rear extremity by first and second frame clamps 72.

Referring again to FIGS. 2A through 2E, the outer ends of the tubular axle 25 have mounting heads 88. Each mounting head 88 has a threaded bore 90 with a diameter sufficient to accept and secure the exteriorly threaded portion 84 of the first and second detachable axle pieces 80 therein. The first and second detachable axle pieces 80 are mounted to the tubular axle 25 by screwing the exteriorly threaded portion 84 into the threaded bore 90.

The first and second disk hub 23 and disk 22 assemblies are secured to the first and second detachable axle pieces 80 by means of a clip ring 39. The clip ring 39 is spring biased to close around and fit in to a circumferential groove 78 cut into the smooth surface portion 82 of the first and second detachable axle pieces 80 at their extreme outer end. In order to allow the first and second disk hub 23 and disk 22 assemblies to rotate on the first and second detachable axle pieces 80, the smooth surface portion 82 of the first and second detachable axle pieces 80 extend axially through a tubular opening 92 at the center of the first and second disk hubs 23 and the outer face of flange 86 abuts a concentric circular shoulder 87 (see FIGS. 2C and 2D) on the inner face 83 of the first and second disk hubs 23 with a spacer ring 94 between. The spacer ring 94 prevents frictional contact between the outer face of flange 86 and the circular shoulder 87 on the inner face of the first and second disk hubs 23. In the preferred embodiment, the spacer ring 94 is a Delrin washer. However it is anticipated that other smooth, durable material can be substituted.

Referring to FIGS. 2A, 2B, and 2E, the outer vertical face 27 of the first and second disk hub have a concentric circular recessed portion 93 surrounding the tubular opening 92.

The horizontal length of the smooth surface portion 82 of the detachable axle piece 80 is sufficient to allow the smooth surface portion 82 to extend through the tubular opening 92 of the first and second disk hubs 23 and expose the circumferential groove 78 on the opposite side of the first and second disk hubs 23 with minimal clearance at the concentric circular recessed portion 93. This allows the clip ring 39 to close around circumferential groove 78 within the concentric circular recessed portion 93.

As shown in FIGS. 2A through 2C, the first and second wheelchair wheels 24 are concentrically mounted on the first and second wheel hubs 37. The inner surface 57 of the first and second wheelchair wheels 24 (See FIG. 2C) is mounted flush against the outer vertical surface 70 (See FIG. 2E) of the flanged inner portion 31 of the first and second wheel hubs 37 and are secured to the first and second wheel hubs 37 by first and second nuts 45, which screw onto exteriorly threaded outer ends 75 of the first and second wheel hubs 37. The first and second wheel hubs 37 have a tubular opening 43 through their center. As shown in FIGS. 2A and 2B, an outer circular bearing assembly 61 is pressed fit into the tubular opening 43 towards the outer end of the first and second wheel hubs 37.

As shown in FIGS. 2B, 2C, and 2D, an inner circular bearing assembly 79 is pressed fit into the tubular opening 43 at the inner end of the first and second wheel hubs 37. The outer bearing assembly 61 and inner bearing assembly 79 have inner rings 63 which turn within the bearing assemblies. The inner diameter of the inner rings 63 is equal to the inner diameter of first and second detachable axle pieces 80. In the preferred embodiment, the outer circular bearing assembly 61 and inner circular bearing assembly 79 are manufactured by NICE, Model No. 1616 DC TN or KYK, Model No. R-8-DDHA1(IB). However, it is anticipated that other similar bearings could be used.

Referring again to FIGS. 2A through 2E, when the first and second wheelchair wheels 24 are mounted to the wheel hub 37 and in turn mounted to the wheelchair 10 (See FIG. 1), the outer vertical faces 27 of the first and second disk hubs 23 interlock with inner faces 77 of the flanged inner portion 31 of the first and second wheel hubs 37. In the preferred embodiment, as shown in FIGS. 2A, 2B, and 2C, the inner faces 77 of the flanged inner portion 31 of the first and second wheel hubs 37 are flat with a plurality of radially spaced holes 96 shown in FIG. 2C. The heads 33 of the plurality of screws 29 fit snugly into the corresponding radially spaced circular holes 96 in the flanged inner portion 31 of the first and second wheel hubs 37. In an alternate embodiment, as shown in FIGS. 2D and 2E, the inner face 77 of the flanged inner portion 31 of the first and second wheel hubs 37 have a raised surface 98 extending from the inner face 77. The raised surface 98 is centered on the inner face 77 with parallel sides 100 extending to the circumference of the inner face 77. The parallel sides 100 extend perpendicularly from the inner face. In this alternate embodiment, the outer vertical faces 27 of the first and second disk hubs 23 have a channel 102. The placement and dimensions of the channel 102 are to allow the raised surface 98 to fit snugly into the channel 102 with minimal clearance at all contiguous surfaces when the first and second wheel hubs 37 are interlocked with the first and second disk hubs 23.

In the preferred embodiment, as shown in FIGS. 2A, 2B, and 2C, the interlocking of heads 33 within the radially spaced circular holes 96 cause the first and second wheelchair wheels 24 and the first and second disks 22 to rotate together. In another alternate embodiment, as shown in FIGS. 2D and 2E, the interlocking of the raised surface 98 on the inner face 77 of the first and second wheel hubs 37 with the channel 102 in the outer vertical faces 27 of the first and second disk hubs 23 cause the first and second wheelchair wheels 24 (See FIG. 1) and the fist and second disks 22 to rotate together.

Still referring to FIGS. 2A through 2E, in order to hold the first and second disk hubs and the first and second wheel hubs together when interlocked, first or second locking pins 35a and 35b (see FIGS. 2A and 2B) extend axially through the center of the first and second wheel hubs 37, the first and second disk hubs 23, and into the first and second detachable axle pieces 80. The first or second locking pins 35a and 35b have a diameter which allows the first or second locking pins 35a and 35b to slide through the inner rings 63 of the outer circular bearing assembly 61 (See FIGS. 2A and 2B) and the inner circular bearing assembly 79 (See FIGS. 2C and 2D) and into the first and second detachable axle pieces 80 with minimal clearance.

The first and second wheelchair wheels 24 can be detached from the wheelchair 10 (See FIG. 1) without removing the first and second disks 22 or disturbing the first and second caliper brakes 18 by removing the first and second locking pins 35a or 35b and separating the first and second wheel hubs 37 from the first and second disk hubs 23.

In the preferred embodiment of the invention (see FIGS. 2A, 2C, 2D, and 2E), the first and second locking pins 35a have a push button 47, a rod 49, an adjusting nut 53, and a set of retractable nipples 55. The push button 47 is spring biased in the released position, causing the retractable nipples 55 to extend from the rod 49. When the push button 47 is depressed, the retractable nipples 55 retract into the rod 49. The first and second locking pins 35a can be inserted through the inner ring 63 of the outer circular bearing assembly 61 and into the tubular openings 43 of the first and second wheel hubs 37 by depressing the push button 47 and thereby causing the retractable nipples 55 to retract. When the first and second locking pins 35a are further inserted through the first and second disk hubs 23 and into the first and second detachable axle pieces 80 and the push button 47 is released, the retractable nipples 55 extend into grooves (not shown) circumferentially cut into the tubular interior surface (not shown) of the first and second detachable axle piece 80. The grooves (not shown) are of sufficient depth and width to allow the retractable nipples 55 to extend into the grooves (not shown) with minimal clearance. The grooves (not shown) are positioned in the first and second detachable axle pieces 80 to allow the retractable nipples 55 to extend into the first and second grooves (not shown) when the first and second locking pins 35a are fully inserted into the first and second wheel hubs 37 such that the adjustable nut 53 contacts the outer surface of the outer circular bearing assembly 61. In the preferred embodiment, the first and second locking pins 35a are QRP Quick Release Push Button (large/small) Axle, Model No. 21QRP11CDASN.

In an alternate embodiment of the invention, the length of the exteriorly threaded portion 84 of the first and second detachable axle pieces 80 is sufficient to allow the position of the retractable nipples 55 on the first and second locking pins 35a to extend beyond the inner lip 85 of the first and second detachable axle pieces 80 when the first and second locking pins 35a are fully inserted into the first and second wheel hubs 37 such that the adjustable nut 53 contacts the outer surface of the outer circular bearing assembly 61. Thus, when the first and second locking pins 35a are fully inserted and the push button 47 is released, the retractable nipples 55 extend adjacent to the inner lip 85 of the first and second detachable axle pieces 80 with minimal clearance and thereby holding the first and second locking pins 35a in place. In this embodiment, the first and second locking pins 35a are, once again, QRP, Quick Release Push Button (large/small), Axle Model No. 21QRP11CDASN.

In yet another embodiment of the invention (see FIG. 2B), the first and second locking pins 35b have a release lever 65 at one end of a rod 67, a spacer joint 69 between the release lever 65 and the rod 67, an expandable tip 71 attached to the other end of the rod 67, and a wedging cap 73 attached to the expandable tip 71 opposite the rod 67. When the release lever 65 is rotated to the released position so that it extends parallel with the rod 67, the diameter of the expandable tip 71 is not expanded and is equal to the diameter of the rod 67. When the release lever 65 is rotated perpendicular to the rod 67, the wedging cap 73 is pulled toward the release lever 65 causing the expandable tip 71 to expand to a diameter greater than the diameter of the rod 67. When the release lever 65 is in the released position, the first and second locking pins 35b can be inserted through the inner ring 63 of the outer circular bearing assembly 61 and into the tubular opening 43 of the first and second wheel hubs 37. When the first and second locking pins 35b are inserted through the first and second wheel hubs 37, and into the first and second detachable axle pieces 80 and the release lever 65 is then rotated perpendicular to the rod 67, the expandable tip 71 expands into and makes frictional contact with the interior surface (not shown) of the first and second detachable axle pieces 80. The frictional force created is great enough to hold the first and second locking pins 35b in place. The diameter of the spacer joint 69 is greater than the inner diameter of the inner ring 63 of the outer circular bearing assembly 61, such that when the first and second locking pins 35b are fully inserted, the spacer joint 69 contacts the outer face of the outer circular bearing assembly 61. In this preferred embodiment, the locking pin 35b is the Ultra Axle, 0.50" O. D. manufactured by Rousson Chamoux.

Figure 6:
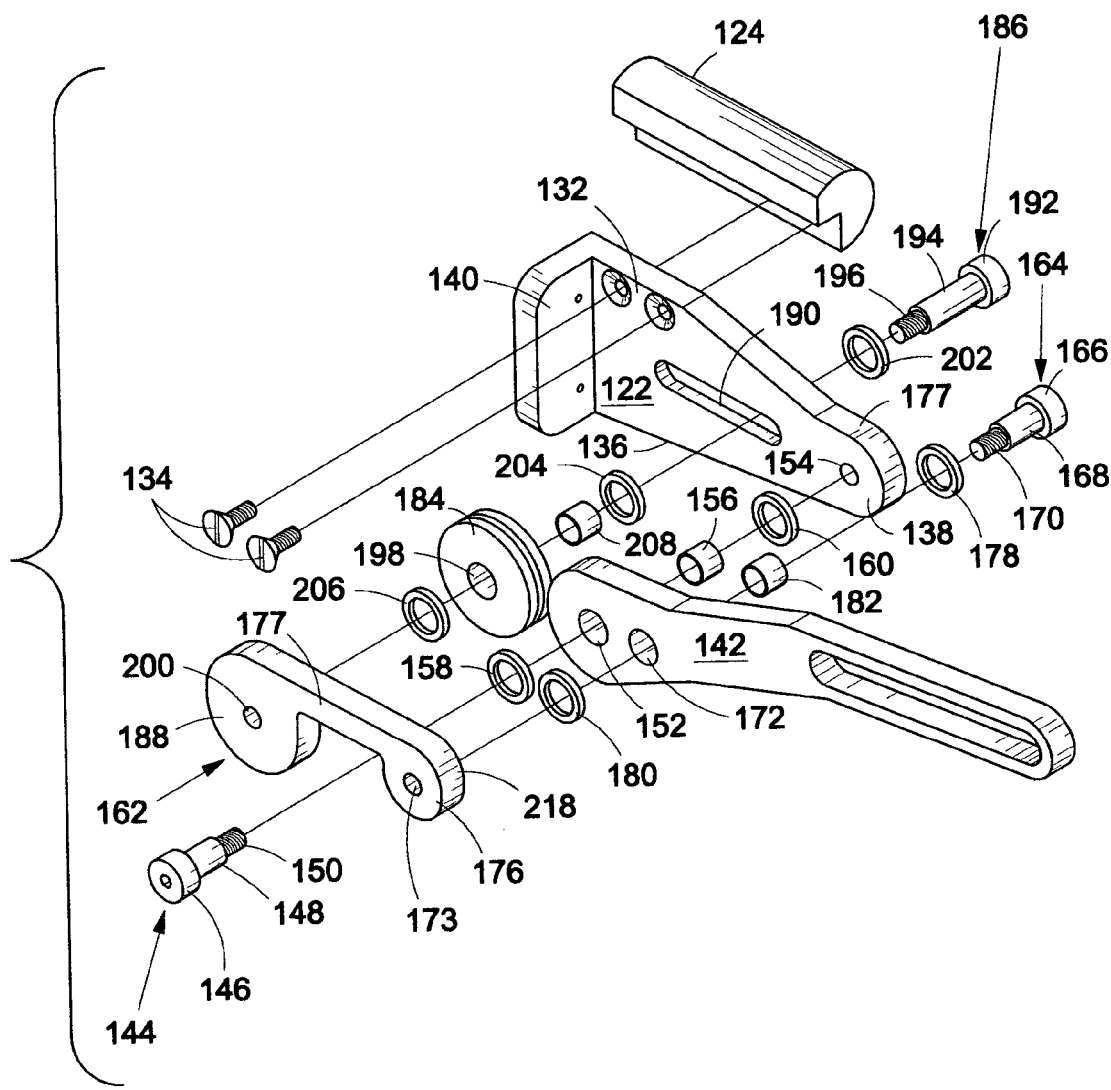
FIG. 6 is an exploded perspective view depicting the manual brake actuator assembly.

Referring to FIGS. 1, 3, 4, and 6, a manual brake actuator assembly 120 has a mounting bracket 122 which is fixed to the horizontal portion 16 of the frame 14 of the wheelchair 10 by a semi-circular mounting shoulder 124 and a clamp 126. The clamp 126 has an upper element 128 and a lower element 130 which when clamped together with a screw 127, form a first channel 129a and a second channel 129b at opposing ends of the clamp 126. The first channel 129a and second channel 129b have curved interior surfaces (not shown). The radial dimensions of the curved interior surfaces (not shown) of the first channel 129a and second channel 129b are sufficient to allow the first channel 129a and second channel 129b to engage and clamp onto the horizontal portion 16 of the frame 124 and the mounting shoulder 124 respectively when the upper element 128 and the lower element 130 of the clamp 126 are clamped together. As shown in FIG. 6, the mounting shoulder 124 is mounted to a generally rectangular base portion 132 of the mounting bracket 122 with flathead screws 134.

Referring to FIGS. 6, 7, and 8a through 8c, the mounting bracket 122 has a straight, horizontal lower edge 136 and gradually narrows along its horizontal length from the base portion 132 at rearward end to a rounded tip 138 at forward end. A perpendicular element 140 which is generally rectangular in shape, extends perpendicularly and outward from the base portion 132 of the at its rearward end.

Still referring to FIGS. 6, 7, and 8a through 8c, an elongated actuating lever 142 is pivotally mounted to the mounting bracket 122 with first allenhead screw 144 having a cylindrical head 146, an intermediate smooth portion 148 and a threaded portion 150. The first allenhead screw 144 is inserted through a non-threaded hole 152 in the actuating lever 142 and into a threaded hole 154 in the mounting bracket 122 such that the actuating arm 142 can pivot on the smooth portion 148 of the first allenhead screw 144.

As shown in FIG. 6, a first protecting sleeve 156 is inserted in the non-threaded hole 152 of the actuating lever 142 around fist the allenhead screw 144. A first washer 158 is axially mounted on the first allenhead screw 144 between the head 146 and the outer surface of the actuating lever 142. A second washer 160 is axially mounted on the first allenhead screw 144 between the inner surface of the actuating lever 142 and the outer surface of the mounting bracket 124.

Referring again to FIGS. 6, 7, and 8a through 8c, a linking element 162, having a circular rearward portion 188, a circular forward portion 176 and a bridging member 177 extending between the rearward and forward portions, is pivotally connected to the actuating lever 142 with a second allenhead screw 164 having a head 166, an intermediate smooth portion 168, and a threaded portion 170. The second allenhead screw 164 extends through a second non-threaded hole 172 in the actuating lever 142 and then through a threaded hole 173 in the center of the forward end 176 of the linking element 162. The second allenhead screw is positioned such that the head extends from the inner surface of the actuating lever 142 and the rounded surface of the head engages and rides on the rounded surface 177 of the rounded tip 138 of the mounting bracket 122 as the actuating lever 142 is rotated. A third washer 178 is axially mounted on the second allenhead screw 164 between the head 166 and the inner surface of the actuating lever 142. A fourth washer 180 is axially mounted to the second allenhead screw 164 between the outer surface of the actuating lever 142 and the inner surface of the linking element 162. A second protective sleeve 182 is inserted into the second non-threaded hole 172 of the actuating lever 142 around the second allenhead screw 162 and pulley 184.

Still referring to FIGS. 6, 7, and 8a through 8c, a pulley 184 is axially and pivotally mounted between the mounting bracket 122 and the rearward end 188 of the linking element with a third allenhead screw 186. The third allenhead screw 186 is inserted through a horizontal guiding slot 190 cut in the mounting bracket 122. The third allenhead screw 186 has a head 192, intermediate smooth portion 192, and a threaded portion 196. The third allenhead screw 186 is positioned such that the head 192 extends from the inner surface of the mounting bracket 122; the intermediate smooth portion 194 extends through the guiding slot 190 and an axial hole 198 in the pulley 184; and the threaded portion 196 extending into a threaded hole 200 in the center of the rearward end 188 of the linking element 162.

Referring to FIG. 6, a fifth washer 202 is axially mounted on the third allenhead screw 186 between the head 192 and the inner surface of the mounting bracket 122. A sixth washer 204 is axially mounted from the third allenhead screw 186 between the outer surface of the mounting bracket 122 and the inner surface of the pulley 184. A seventh washer 206 is axially mounted on the third allenhead screw 186 between the outer surface of the pulley 184 and the inner surface of the linking element 162. The protective sleeve 208 is inserted in the axial hole 198 of the pulley 184 around the third allenhead screw 186.

Figure 7:
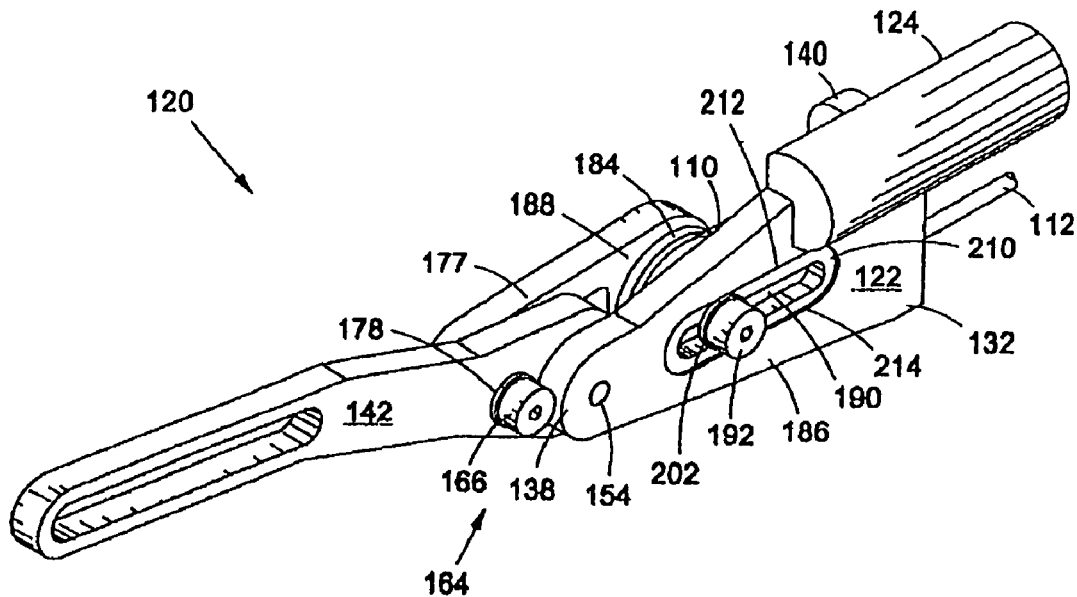
FIG. 7 is a perspective view depicting the manual brake actuator assembly.

As shown in FIG. 7, the guiding slot 190 is generally rectangular in shape and elongated horizontally. The horizontal centerline of the guiding slot is horizontally aligned with the centerline of the threaded hole 154 in the mounting bracket 122. The inner face of the mounting bracket 122 has a recessed ledge 210 which surrounds the guiding slot 190. The vertical width of the recessed ledge 210 around the guiding slot 190 sufficient to allow fifth Washer and head 192 of the third allen head screw 186 to fit between an upper lip and a lower lip 214 of the recessed ledge 210.

Figure 5:
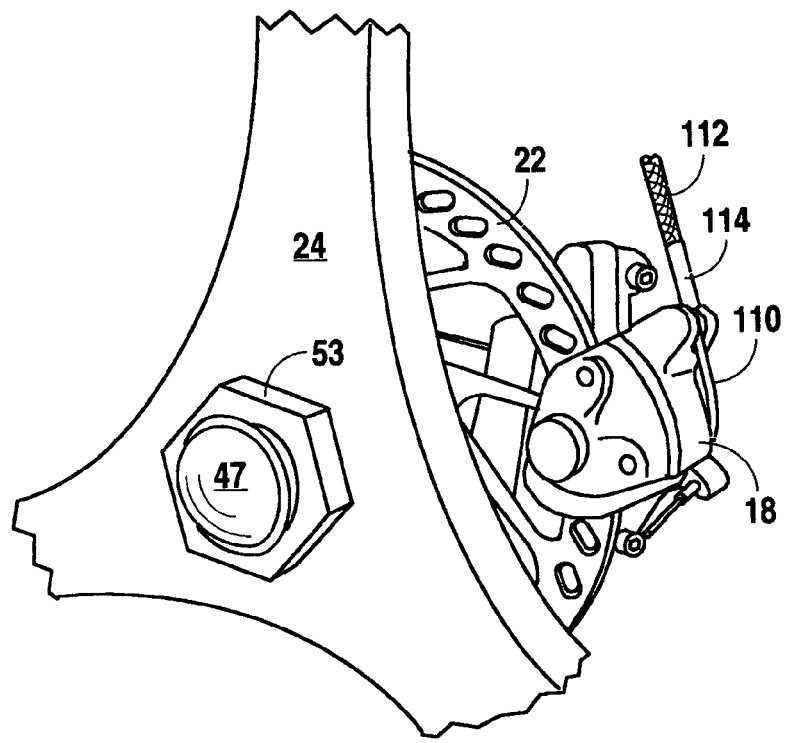
FIG. 5 is a perspective view depicting the caliper brake mechanism and disc.

Referring to FIGS. 1 and 5, first and second caliper brakes 18 are mounted to extension plates (not shown) which are in turn mounted to the frame 14 of the wheelchair 10. The caliper brakes 18 are positioned to clamp onto first and second disks 22. In the preferred embodiment of this invention, the first and second caliper brakes 18 are manufactured by Hayes/HMX, model number BR3920. However, numerous other cable actuated caliper brakes are available on the market and can be used in this invention. The first and second wheelchair wheels 24 can be detached without removal of the first and second disks 22 or the first and second caliper brakes 18.

Still referring to FIGS. 1 and 5, the first and second caliper brakes 18 are activated by pulling a cable wire 110 (See FIGS. 4 and 5) attached to the caliper brakes 18 at first and second ends of the cable wire 110. The first and second ends of the cable wire 110 are directed to the first and second caliper brakes 18 through a cable wire housing 112 which is attached to a nozzle 114 on the first and second caliper brakes 18. The first and second ends of the cable wire 110 are attached to the first and second caliper brakes 18, respectively, in typical fashion. The cable wire 110 passes through the nozzle 114 of the first and second caliper brakes 18 and into the cable wire housing 112.

Referring now to FIGS. 1, 7, and 8a through 8c, the cable wire 110 is directed from the first and second caliper brakes 18 through the cable wire housing 112 to the manual actuating brake assembly. The cable wire 110 extends to through small openings 116 and around the pulley 184 in the perpendicular element 140 of the mounting bracket 122. The centers of the Small openings 116 are equal distance from the base portion 132 of the mounting bracket 122 and are vertically spaced a distance equal to the diameter of the pulley 184.

Figure 8A:
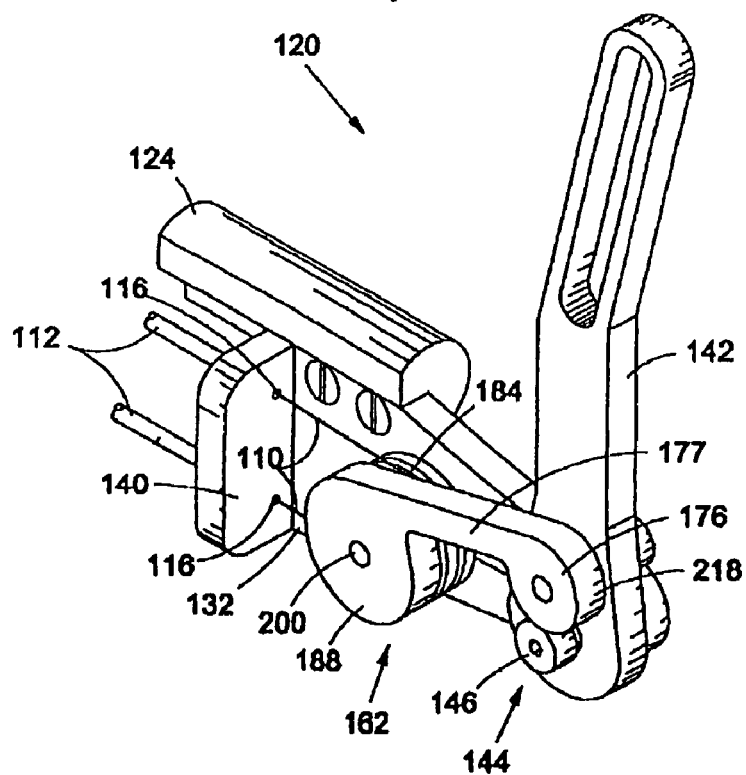
FIG. 8A is a perspective view of the manual brake actuator assembly depicting the lever arm is a vertical non-braking position.
Figure 8B:
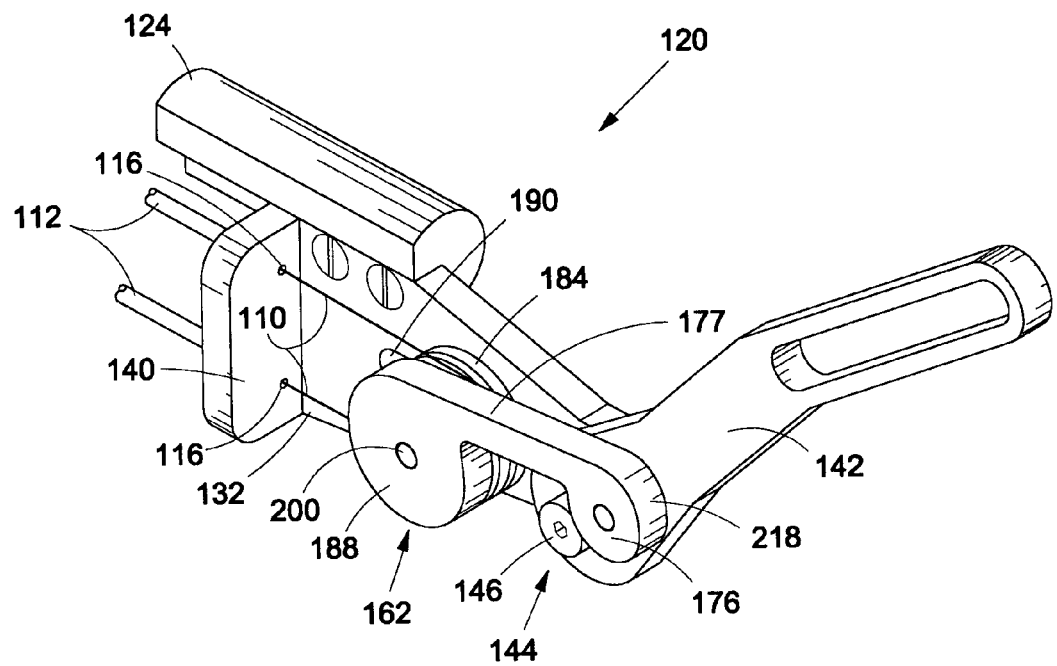
FIG. 8B depicts the manual brake actuator assembly with the lever arm in a partially braking position.

Referring to FIGS. 1 and 8a through 8c, in operation of preferred embodiment of this invention, the first and second caliper brakes 18 are activated by rotating the actuating lever 142. When the actuating lever 142 is in its upright, vertical positioned as shown in FIG. 8a, the first and second caliper brakes 18 are deactivated. As the actuating lever 142 is rotated in a forward direction as shown in FIG. 8b, it causes the linking element 162 to rotate and at the same time displace in a forward horizontal direction. The linking element 162, in turn, causes the pulley 184 to displace in a forward, horizontal direction. As the pulley 184 displaces forward, the intermediate smooth portion 194 of the third allenhead screw 186 slides forward within the guiding slot 190 and thereby maintaining the movement of the pulley 184 in constant horizontal plane. Additionally, as the pulley 184 moves in a forward direction, it pulls the cable wire 110 and thereby activating the first and second caliper brakes 18 with equal force. The first and second caliper brakes 18 are released by rotating the actuating lever 142 backward towards its vertical, upright position as shown in FIG. 8a.

Figure 8C:
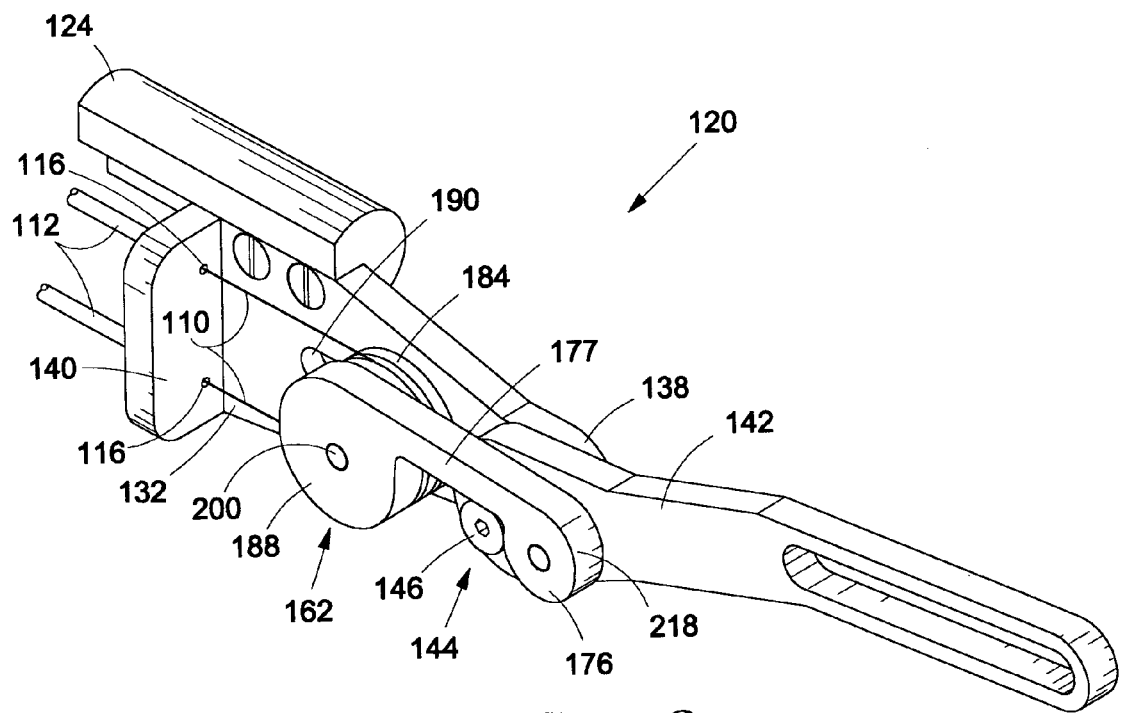
FIG. 8C depicts the manual brake actuator assembly with the lever arm in a horizontal full braking position.

As shown in FIGS. 8a and 8c, as the actuating lever 162 is rotated forward, the curved surface 218 of the forward end 176 of the linking element 162 engages and rides on the curved surface of the head 146 of the first allenhead screw 144. When the actuating lever 142 is rotated forward to a horizontal position, as shown in FIG. 8c, the linking element 162 moves to an "overcenter" locking position such that the curved surface 218 of the forward end 176 of the linking element 162 engages the curved surface of the head 146 of the first allenhead screw 144 at its forward most point. In this position, the maximum braking force of the caliper brake 18 is achieved and prevents further movement of the wheelchair.

An alternate embodiment of the invention is shown in FIGS. 9a through 9c and FIG. 10. In this embodiment, a exteriorly threaded plunger assembly 220 extends through the mounting bracket 122 through an interiorly threaded hole (not shown) and is secured to the mounting bracket 122 with a nut 224. The plunger assembly 220 has a spring biased rounded plunger head 226. The plunger assembly 220 is positioned to allow the plunger head 226 to extend into a plurality of semi-hemispherical notches 228 on the inner surface of the actuating lever 142.

Figure 9A:
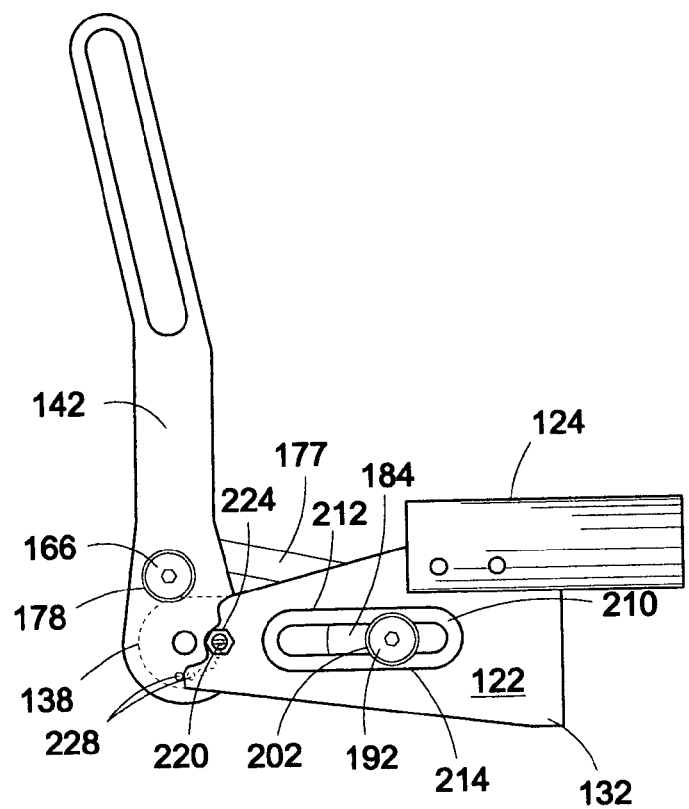
FIG. 9A is a side view of an alternative embodiment of the present invention depicting the manual brake actuator assembly with a plunger mechanism with the lever arm in a vertical non-braking position.
Figure 9B:
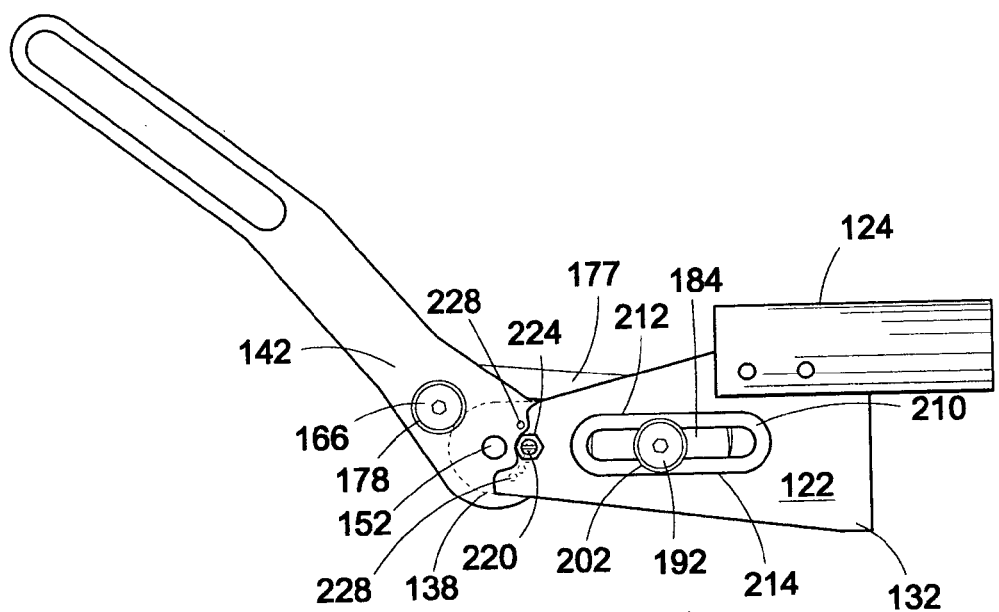
FIG. 9B is the alternative embodiment of the present invention as shown in FIG. 9A with the actuating lever in a partial braking position.
Figure 9C:
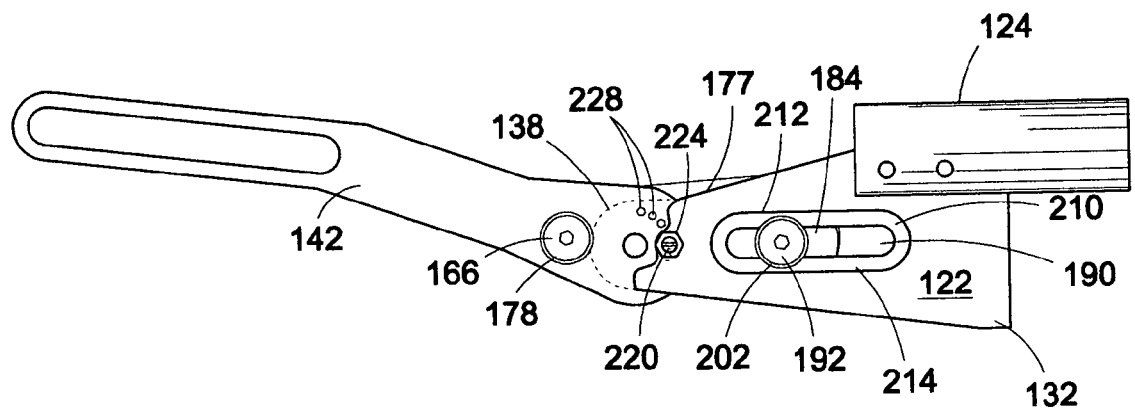
FIG. 9C is the alternative embodiment of the present invention as shown in FIG. 9A and 9B with the actuating lever in a horizontal full braking position.
Figure 10:
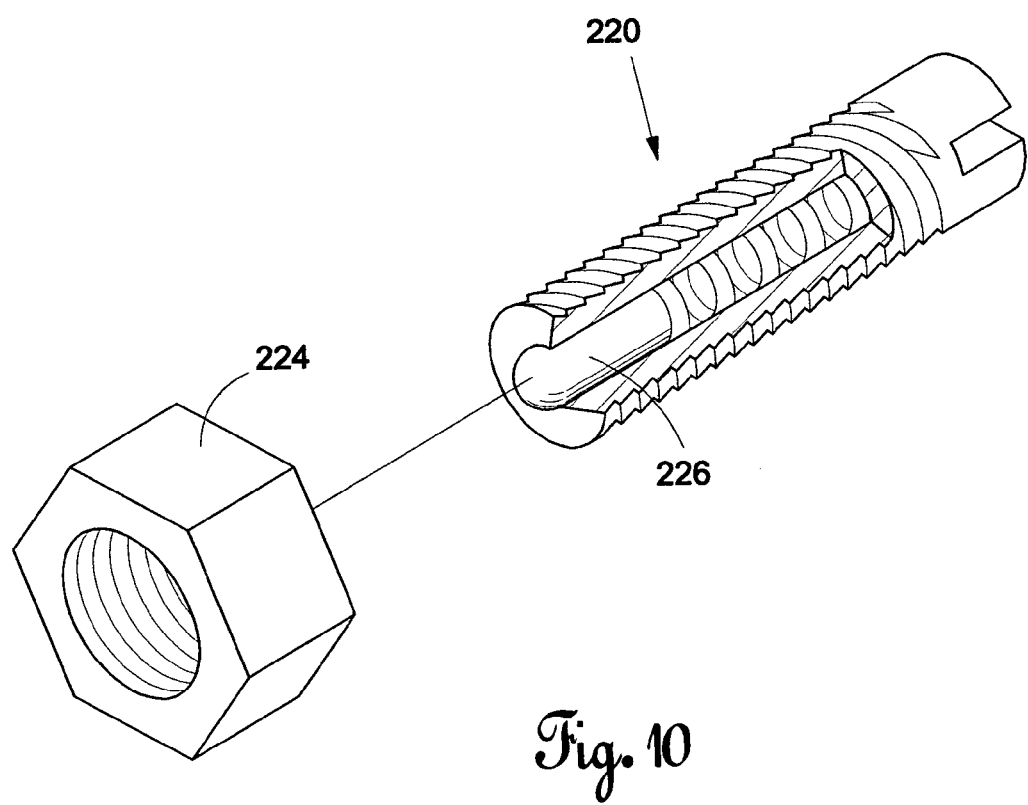
FIG. 10 is an enlarged perspective view of the plunger mechanism provided in the alternative embodiment of the present invention depicted in FIGS. 9A–9C.

The notches 228 are radially spaced around the first non-threaded hole 152 in the actuating lever 142. The notches are positioned to receive the plunger head 226 when the actuating lever 142 is rotated to a series of positions equal to the number of notches 228. The first in the series of notches 228 is positioned to the plunger head 226 when the actuating lever 142 when it is in an upright vertical position, as shown in FIG. 9a, and the braking force is deactivated. The last in the series of notches 228 is positioned to receive the plunger head 226 when the actuating lever 142 in the horizontal position, as shown in FIG. 9c, and the braking force is fully activated. Each of the intermediate notches 228 are positioned to receive the plunger head 226 when the actuating lever 142 is rotated to positions between the upright, vertical position and the horizontal position creating various levers of braking force. The spring biased plunger head 226 presses into the notches 228 with sufficient force to maintain the rotated position of the actuating lever 142 until sufficient manual force is exerted on the actuating lever 142.

Although this alternative embodiment of the invention incorporates the use of notches 228 on the inner surface of the actuating lever 142 positioned to receive a plunger head 226, it is anticipate that other means of maintaining the actuating lever 142 in a rotated position could be used. For instance, it is anticipated that a ratcheting or gear mechanism could be used for that purpose.

The operation of this alternative embodiment of the invention is identical to the operation of the preferred embodiment with the exception of the use of notches 228 and plunger assembly 220. These additional elements allow the user to rotate the actuating lever 142 into varying positions to exert a varying braking force on the disks 22. The combination of the plunger assembly 220 and the notches 228 allow the user to release the actuating lever 142 and maintain the desired braking force and thereby allowing the user to keep both hands on the wheels for steering or for other purposes while braking.

Although the invention has been described with reference to specific embodiments, this description is not meant to be construed in a limited sense. Various modifications of the disclosed embodiments, as well as alternative embodiments of the inventions will become apparent to persons skilled in the art upon the reference to the description of the invention. It is, therefore, contemplated that the appended claims will cover such modifications that fall within the scope of the invention.

I claim:

1. A manual braking system for wheels of a wheelchair comprising:
    caliper brakes mounted to said wheelchair;
    a manual brake actuator mounted to said wheelchair;
    a braking cable connected from said caliper brakes to said manual braking actuator over a pulley, said pulley providing substantially equal force on each of said caliper brakes; and
    said manual brake actuator being lockable in a plurality of braking positions.

2. The manual braking system as recited in claim 1 wherein said manual brake actuator provides an incremental braking force to said caliper brakes.

3. The manual braking system as recited in claim 1 wherein said manual brake actuator provides a variable braking force to said caliper brakes.

4. The manual braking system as recited in claim 1 wherein the axis of said pulley is displaceable.

5. The manual braking system as recited in claim 1 further comprising disks mounted to said wheels of said wheelchair, whereby said caliper brakes are positioned to exert a braking force on said disks.

6. The manual braking system as recited in claim 1 wherein said manual brake actuator is a lever pivotally mounted to said wheelchair.

7. The manual braking system as recited in claim 6 further comprising a linking element connected to both said pulley and said lever and causing said pulley to displace when said lever is rotated.

8. The manual braking system as recited in claim 7 further comprising:
    a mounting bracket fixedly mounted to said wheelchair, said lever being pivotally mounted to said mounting bracket;
    a guiding slot in said mounting bracket; and
    an elongated mounting element extendable through said guiding slot, said pulley and said linking element, said mounting element being slidable within said guiding slot and with said pulley and said linking element being rotatable therein.

9. The manual braking system as recited in claim 6, wherein said lever can be locked in a plurality of rotated positions.

10. The manual braking system as recited in claim 9 further comprising:
    a plurality of notches radially spaced around a pivot point of said lever;
    a plunger mountable to said mounting bracket, said plunger being insertable into said notches to lock said lever in a rotated position.

11. A manual braking system for wheels of a wheelchair comprising:
    caliper brakes mounted to said wheelchair;
    a manual brake actuator mounted to said wheelchair;
    a braking cable connected from said caliper brakes to said manual braking actuator over a pulley, said pulley providing substantially equal force on each of said caliper brakes; and
    said manual brake actuator being lockable at a plurality of breaking positions for providing a variable and an incremental braking force to said caliper brakes.

12. The manual braking system for wheels of a wheelchair as recited in claim 11 wherein said pulley's axis is displaceable.

13. The manual braking system for wheels of a wheelchair as recited in claim 11 further comprising disks mountable to said wheels of said wheelchair, whereby said caliper brakes are positioned to exert a braking force on said disks.

14. The manual braking system for wheels of a wheelchair as recited in claim 11 wherein said manual brake actuator is a lever pivotally mounted to said wheelchair.

15. The manual braking system for wheels of a wheelchair as recited in claim 14 further comprising:

a linking element connected to both said pulley and said lever and causing said pulley to displace when said lever is rotated.

16. The manual braking system for wheels of a wheelchair as recited in claim 15 further comprising:

a mounting bracket fixedly mounted to said wheelchair, said lever being pivotally mounted to said mounting bracket;

a guiding slot in said mounting bracket;

an elongated mounting element extendable through said guiding slot, said pulley, and with said linking element, said mounting element being slidable within said guiding slot and said pulley and said linking element being rotatable thereon.

17. The manual braking system for wheels of a wheelchair as recited in claim 16 further comprising:

a plurality of notches radially spaced around a pivot point of said lever;

a plunger mountable to said mounting bracket, said plunger being insertable into said notches to lock said lever arm in a rotated position.

18. The manual braking system for wheels of a wheelchair as recited in claim 14, wherein said lever can be locked in a plurality of rotated positions.

* * * * *